US010922994B2

(12) United States Patent
Butler et al.

(10) Patent No.: US 10,922,994 B2
(45) Date of Patent: *Feb. 16, 2021

(54) INTERACTIVE PHONICS GAME SYSTEM AND METHOD

(71) Applicant: Square Panda, Inc., Sunnyvale, CA (US)

(72) Inventors: Andrew Butler, Sunnyvale, CA (US); F Brian Iannce, San Jose, CA (US); Carey Lee, Redwood City, CA (US); Hector Javier Farias, Castro Valley, CA (US)

(73) Assignee: Square Panda, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/794,591

(22) Filed: Feb. 19, 2020

(65) Prior Publication Data

US 2020/0184842 A1 Jun. 11, 2020

Related U.S. Application Data

(63) Continuation of application No. 16/451,756, filed on Jun. 25, 2019, now Pat. No. 10,607,501, which is a
(Continued)

(51) Int. Cl.
*G09B 17/00* (2006.01)
*A63H 3/36* (2006.01)
*A63H 17/26* (2006.01)
*G06F 3/0346* (2013.01)
*G09B 5/06* (2006.01)

(52) U.S. Cl.
CPC ............. *G09B 17/003* (2013.01); *A63H 3/36* (2013.01); *A63H 17/26* (2013.01); *G06F 3/0346* (2013.01); *G09B 5/065* (2013.01); *A63H 2200/00* (2013.01)

(58) Field of Classification Search
None
See application file for complete search history.

(56) References Cited

U.S. PATENT DOCUMENTS 5,823,782 A  10/1998  Marcus et al.
5,853,327 A  12/1998  Gilboa
(Continued)

OTHER PUBLICATIONS

"U.S. Appl. No. 14/838,307, Non Final Office Action dated Aug. 9, 2016", 13 pgs.
(Continued)

*Primary Examiner* — Jay Trent Liddle
*Assistant Examiner* — Alex F. R. P. Rada, II
(74) *Attorney, Agent, or Firm* — Schwegman Lundberg & Woessner, P.A.

(57) ABSTRACT

A system for encouraging a child to learn to read, comprising a computing device and at least one physical manipulative, wherein the computing device can identify the physical manipulative and display at least one word relating to the physical manipulative. In an embodiment, a letter identification hoard with letter manipulatives is included, wherein a child can spell out a word on the letter identification board and the computing device shows an animation of the physical manipulative performing the action indicated by the word.

21 Claims, 4 Drawing Sheets

Related U.S. Application Data continuation of application No. 15/428,154, filed on Feb. 9, 2017, now Pat. No. 10,380,909, which is a continuation of application No. 14/838,307, filed on Aug. 27, 2015, now abandoned.

(60) Provisional application No. 62/044,310, filed on Aug. 31, 2014.

(56) References Cited

U.S. PATENT DOCUMENTS

| | | |
|---|---|---|
| 6,290,565 B1 | 9/2001 | Galyean, III et al. |
| 6,394,872 B1 | 5/2002 | Watanabe et al. |
| 7,050,754 B1 | 5/2006 | Marcus et al. |
| 8,057,233 B2 | 11/2011 | Owen |
| 8,287,372 B2 | 10/2012 | Hong et al. |
| 8,495,133 B2 | 7/2013 | Hoo |
| 8,926,395 B2 | 1/2015 | Zheng |
| 10,380,909 B2 | 8/2019 | Butler et al. |
| 10,607,501 B2 * | 3/2020 | Butler ............... G06F 3/0346 |
| 2002/0160340 A1 | 10/2002 | Marcus et al. |
| 2003/0148249 A1 | 8/2003 | Marcus et al. |
| 2006/0215476 A1 | 9/2006 | Owen |
| 2009/0137185 A1 | 5/2009 | Zheng |
| 2011/0016173 A1 | 1/2011 | Hoo |
| 2012/0295704 A1 | 11/2012 | Reiche et al. |
| 2013/0165223 A1 | 6/2013 | Leyland et al. |
| 2013/0296058 A1 | 11/2013 | Leyland et al. |
| 2013/0303047 A1 | 11/2013 | Albert et al. |
| 2014/0030955 A1 | 1/2014 | Smetanin et al. |
| 2014/0162785 A1 | 6/2014 | Reiche et al. |
| 2014/0273717 A1 | 9/2014 | Judkins et al. |
| 2014/0274313 A1 | 9/2014 | Bala et al. |
| 2014/0364240 A1 | 12/2014 | Leyland |
| 2015/0065258 A1 | 3/2015 | Meade |
| 2015/0087427 A1 | 3/2015 | Wane |
| 2016/0184724 A1 | 6/2016 | Butler et al. |
| 2017/0213475 A1 | 7/2017 | Butler et al. |
| 2019/0318647 A1 | 10/2019 | Butler et al. |

OTHER PUBLICATIONS

"U.S. Appl. No. 15/428,154, Corrected Notice of Allowability dated May 13, 2019", 2 pgs.

"U.S. Appl. No. 15/428,154, Final Office Action dated Dec. 5, 2018", 11 pgs.

"U.S. Appl. No. 15/428,154, Non Final Office Action dated Feb. 8, 2018", 21 pgs.

"U.S. Appl. No. 15/428,154, Notice of Allowance dated Apr. 3, 2019", 7 pgs.

"U.S. Appl. No. 15/428,154, Response filed Aug. 5, 2018 to Non Final Office Action dated Feb. 8, 2018", 26 pgs.

"U.S. Appl. No. 15/428,154, Response filed Mar. 5, 2019 to Final Office Action dated Dec. 5, 2018", 12 pgs.

"U.S. Appl. No. 16/451,756, Examiner Interview Summary dated Oct. 9, 2019", 3 pgs.

"U.S. Appl. No. 16/451,756, Non Final Office Action dated Aug. 5, 2019", 18 pgs.

"U.S. Appl. No. 16/451,756, Notice of Allowance dated Nov. 20, 2019", 7 pgs.

"U.S. Appl. No. 16/451,756, Preliminary Amendment filed Jul. 25, 2019", 3 pgs.

"U.S. Appl. No. 16/451,756, Response filed Oct. 24, 2019 to Non-Final Office Action dated Aug. 5, 2019", 17 pgs.

* cited by examiner

INTERACTIVE PHONICS GAME SYSTEM AND METHOD

CROSS-REFERENCE TO RELATED APPLICATIONS

The present application is a continuation of U.S. application Ser. No. 16/451,756, filed Jun. 25, 2019, which is a continuation of U.S. application Ser. No. 15/428,154, filed Feb. 9, 2017, which is a continuation of U.S. application Ser. No. 14/838,307, filed Aug. 27, 2015, which is a continuation in part of U.S. application Ser. No. 14/838,307, filed Aug. 27, 2015, which claims the benefit of priority of U.S. Provisional App. No. 62/044,310, filed Aug. 31, 2014, which are herein incorporated by reference in their entireties.

BACKGROUND

Field of the Invention

The present invention is generally in the area of educational toys for children, and specifically relates to a system and method of teaching phonics involving physical manipulatives as well as software.

Description of Related Art

Children learning to read are often encouraged to use phonics to "sound out" letters in a word. This helps the child understand the sounds made by different letters and thus assimilate the rules of English spelling and pronunciation. Since children are physical learners and respond well to tactile stimulation, many manipulatives exist for the purpose of teaching reading—alphabet blocks, letter-shaped magnets, and other similar things. A child using such toys can learn the shape of the letters by touch as well as by sight and thus learn them better.

Many software games exist for the purpose of teaching children to read, but as mentioned, for optimal learning, it is desirable for such a software game to interact with a system involving physical manipulatives. A need therefore exists for a system that can interact with manipulatives, identify them, and communicate this information to a computing device.

SUMMARY OF THE INVENTION

An object of the present invention is to provide a system for identifying toy manipulatives, communicating the identification information to a computing device, and using it to instruct the child in reading.

Another object of the present invention is to provide an educational toy that combines physical manipulatives with a software game.

The system of the present invention comprises at least one physical manipulative; a computing device comprising a display, a user interface, an identification module for identifying the at least one physical manipulative, and a communication module for communicating with a server; and a server comprising a database wherein the database comprises a listing of physical manipulative and at least one descriptive attribute for each physical manipulative. The computing device is configured to identify the physical manipulative and to display or modify at least one word related to the physical manipulative on the display.

In an embodiment, the system also comprises a set of letter manipulatives, a letter identification board on which the letter manipulatives are placed, an identification module for identifying the letter manipulatives that are placed on the letter identification board. The computing device is further configured to identify any letter manipulatives placed on the letter identification board and identify a word spelled out by the letter manipulatives.

The physical manipulatives can be animal figures, cartoon characters, dolls, action figures, or vehicles.

The descriptive attributes can be personality, habits, sounds, phrases, geographic origin, size, diet, spelling of a name, pronunciation of a name, at least one Internet link. The at least one word may be related to the at least one descriptive attributes.

The identification module may comprise a camera, a NFC module, a QR reader, a bar code reader, a RF receiver, or a sound detection device.

The computing device may also be configured to detect a motion pattern of the physical manipulative and display at least one word related to the motion pattern on the display.

The computing device may also be configured to identify at least one word spelled out by the letter manipulatives. If the at least one word relates to an action, the computing device displays an animation showing the physical manipulative performing the action; if the at least one word relates to an orientation, the computing device displays the physical manipulative in that orientation; if the at least one word relates to a position, the computing device displays the physical manipulative in the position.

The computing device may also be configured to detect the orientation of the physical manipulative and display at least one word relating to the orientation on the display.

The computing device may be a tablet, laptop, smartphone, desktop, or a wearable computing device such as smart glasses.

In an embodiment, there are two physical manipulatives. The computing device is further configured to detect their relative position, the absolute position of each physical manipulative, or the orientation of each physical manipulative, and display at least one word relating to the interaction between the two physical manipulatives.

In an embodiment, there are two physical manipulatives, and the computing device is further configured to identify at least one word spelled out by the letter manipulatives, and if the at least one word relates to the relationship between the two physical manipulative, the computing device displays an animation showing the relationship between the two physical manipulatives.

The method of the present invention comprises detecting the presence of at least one physical manipulative near a computing device, identifying the physical manipulative, and using the computing device to display at least one word relating to the physical manipulative.

In an embodiment, the method of the present invention further comprises detecting the presence of at least one letter manipulative on a letter identification board, identifying each letter manipulative, identifying a word spelled out by the at least one letter manipulative, and if the word relates to an action, using the computing device to display an animation of the physical manipulative performing the action; if the word relates to an orientation, using the computing device to display the physical manipulative in the orientation; and if the word relates to a position, using the computing device to display the physical manipulative in the position.

In an embodiment, the method of the present invention further comprises detecting a motion pattern of the physical manipulative near the computing device and using the computing device to display at least one word relating to the physical manipulative and the motion pattern.

In an embodiment, the method of the present invention further comprises detecting the presence of a second physical manipulative near the computing device, using the computing device to identify any relationship between the physical manipulative and the second physical manipulative, and using the computing device to display at least one word relating to the relationship between the physical manipulative and the second physical manipulative.

In an embodiment, the method of the present invention further comprises detecting the presence of a second physical manipulative near the computing device, detecting the presence of at least one letter manipulative on a letter identification board, identifying each letter manipulative, identifying a word spelled out by the at least one letter manipulative, and if the word relates to a relationship, using the computing device to display the physical manipulative and the second physical manipulative in the relationship.

In an embodiment, the method further comprises identifying at least one descriptive attribute pertaining to the physical manipulative, such as personality, habits, sounds, phrases, geographic origin, size, diet, spelling communication of a name, or link to the Internet, and displaying at least one word pertaining to the at least one descriptive attribute.

In an embodiment, the at least one physical manipulative is a doll, an animal figure, a cartoon character figure, an action figure, a vehicle.

The step of identifying the at least one physical manipulative may be performed by a QR reader, a bar code reader, a camera, a NFC reader, a RF receiver, or a sound detection device.

DETAILED DESCRIPTION

Several embodiments of the present invention are described below. It will be understood that the invention is not limited to these embodiments, but is only limited by the appended claims.

While any computing device may be used to implement the present invention, assuming it has sufficient computing power to identify a physical manipulative and to display animations on the screen, a tablet is used in the preferred embodiment. It will be understood, however, that any laptop, smartphone, desktop computer, or gaming device may also be used to implement the present invention. Wearable computing devices comprising head-mounted displays may also be used. For simplicity, the word "tablet" will be used in the below disclosure to describe the computing device.

Figure 1:
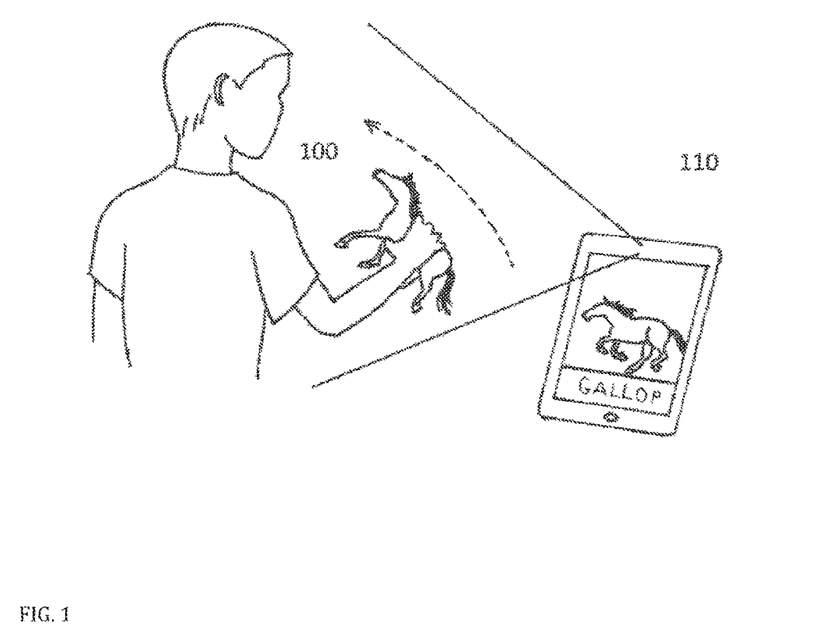
FIG. 1 shows an embodiment of the present invention.

In its preferred embodiment, as shown in FIG. 1, the present invention is implemented on a tablet 110, which comprises a display, a user interface (a touchscreen), a communication module for communicating with a server (via the Internet), and a camera for identifying a physical manipulative. A physical manipulative 100 is moved in front of the tablet 110. The tablet identifies the physical manipulative (preferably visually by using the camera) and displays at least one word relating to the physical manipulative on the screen. For example, it can display the word HORSE if a horse physical manipulative is displayed.

In an embodiment, the tablet 110 is programmed to identify the motion pattern of the physical manipulative 100 as well. This embodiment is shown in FIG. 1. If the horse physical manipulative 100 is moved as if it were galloping, the tablet displays the word GALLOP. This enables a child to learn a new word, to learn how it is spelled, and to learn what it means.

While the physical manipulative 100 is identified visually in the preferred embodiment, it may also be identified by NFC, RFID, sound, a QR pattern, or a bar code. Each physical manipulative may comprise an MID chip or a QR pattern or a bar code, and a bar code reader, QR reader, NFC module, or RF receiver may be used to identify the physical manipulative.

In an embodiment, the method of identifying the motion of the physical manipulative is different from the method of identifying the physical manipulative itself. So, for example, the tablet's camera can be used to determine how the physical manipulative is moving, while a NFC chip could be used to identify the physical manipulative.

The physical manipulative may be any toy that is easily manipulated by a child. For example, animal figures, stuffed animals, cartoon character figures, dolls, action figures, or vehicles may be used. While it is preferable for the physical manipulative to represent an anthropomorphic character or vehicle such as are commonly used in imaginative play by children, it is not necessarily required. For example, an embodiment of the invention may use blocks.

In the preferred embodiment, the physical manipulative represents a character or an object that has at least one descriptive attribute. For example, a horse is an animal, it goes "Neigh!", it eats grass, it is large, and so on. Such descriptive attributes may be stored in a database and retrieved when a horse manipulative is displayed in front of the computing device. So, rather than displaying the word GALLOP as shown in the Figure, the display may show the word NEIGH or the phrase I EAT GRASS.

Figure 2:
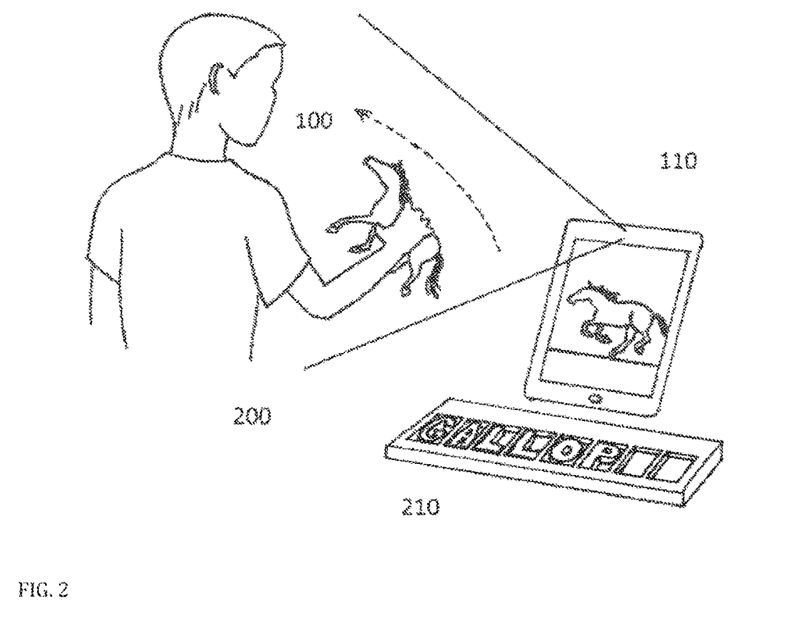
FIG. 2 shows an embodiment of the present invention that also comprises a letter identification board.
Figure 3:
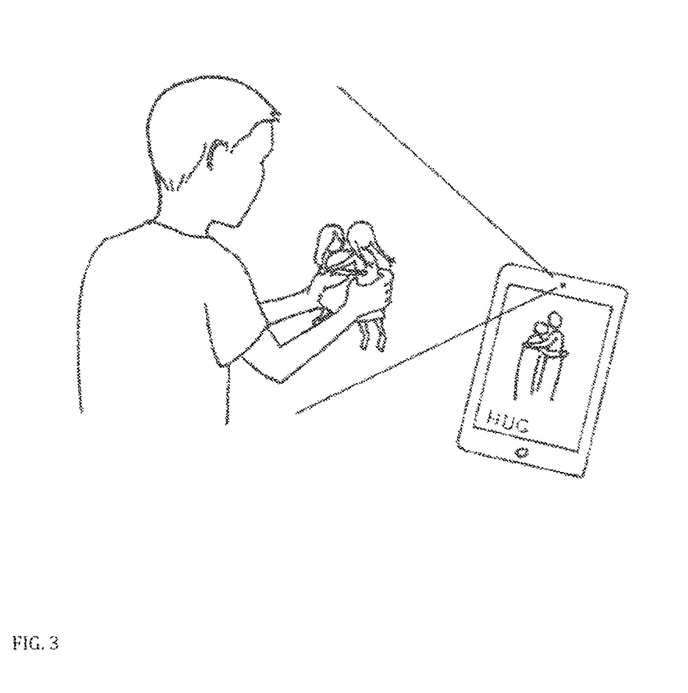
FIG. 3 shows an embodiment of the present invention.
Figure 4:
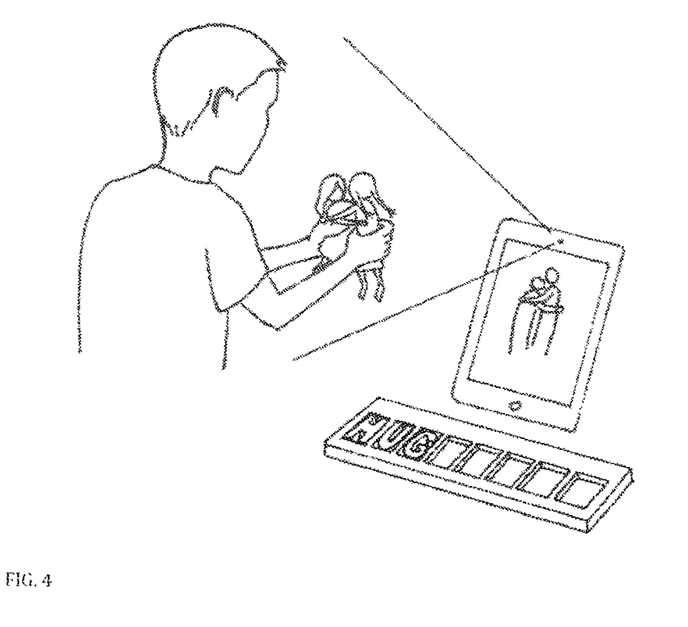
FIG. 4 shows an embodiment of the present invention that also comprises a letter identification board.

In an embodiment shown in FIG. 2, a letter identification board 200 and letter manipulatives 210 are connected to the tablet 110. A user may spell out a word (like GALLOP). The letter identification board 200 identifies each letter and communicates the data to the tablet 110; the tablet determines whether or not the letters spell out a word, and if they do, determines whether or not the word can be used to describe an action, a position, an orientation, or a relationship. In the preferred embodiment, this is accomplished by a database comprising lists of "action words", "position words", and so on. For example, "action words" may be words like RUN, WALK, JUMP, TWIRL, GALLOP, TROT, HOP; "position words" may be words like ON TOP, BELOW, ABOVE, LEFT, RIGHT; "relationship words" may be words like HUG, KISS, HIT, CARRY, SIT ON; "orientation words" can be UPSIDE-DOWN, SIDEWAYS, RIGHT SIDE UP, and so on. FIG. 3 shows an interaction between two physical manipulatives; the two dolls are hugging, so the word HUG is displayed on the screen. In FIG. 4, a letter identification board is used to spell out the word HUG, and two manipulatives are shown in front of the camera; an animation showing the two figures hugging is displayed on the screen.

After the word is identified and determined to be an "action word" (or "position word", "relationship word", or "orientation word"), the tablet identifies any physical manipulatives present in front of the camera. If a physical manipulative is present in front of the camera, the tablet shows the physical manipulative performing the action. For example, spelling out the word GALLOP on the letter identification board, and displaying a horse manipulative in front of the tablet, will result in an animation of a galloping horse. If the word is not an "action word", the animation will not be displayed.

In an embodiment, if the word is an "action word" but wrong for the particular physical manipulative i.e. the word GALLOP combined with a frog), the system may display a message that frogs do not gallop, or display a smiley face laughing at the silliness of a galloping frog.

The letter identification board may use any method of identifying the letters present on the board. Capacitive sensors are used in the preferred embodiment, as disclosed in prior application Ser. No. 14/816,536; however, any other sensors may be used.

Exemplary embodiments have been described above. It will, however, be clear to a person of reasonable skill that the invention encompasses other embodiments, which also fall into the scope of the present invention.

What is claimed is:

1. A method comprising:
    detecting, by one or more processors, a first figurine together with a second figurine both within a detection range of a sensor;
    determining, by the one or more processors, a word that describes an action performable by the first figurine together with the second figurine;
    determining, by the one or more processors, that an animation is correlated to the word by a database in which a list of words includes the word that describes the action, the correlated animation depicting the action performable by the first figurine together with the second figurine; and
    causing, by the one or more processors, a display screen to present the animation that is correlated to the word by the database and that depicts the action performable by the first figurine together with the second figurine.

2. The method of claim 1, further comprising:
    identifying the first figurine and the second figurine based on the detecting of the first figurine together with the second figurine both within the detection range of the sensor; and wherein:
    the determining of the word that describes the action performable by the first figurine together with the second figurine is responsive to the identifying of the first figurine and the second figurine.

3. The method of claim 2, wherein:
    the identifying of the first figurine includes identifying at least one of a first animal figure, a first anamorphic figure, a first cartoon figure, or a first action figure; and
    the identifying of the second figurine includes identifying at least one of a second animal figure, a second anamorphic figure, a second cartoon figure, or a second action figure.

4. The method of claim 1, further comprising:
    determining a relationship of the first figurine relative to the second figurine; and wherein:
    the causing of the display screen to present the animation that depicts the action performable by the first figurine together with the second figurine is based on the determined relationship of the first figurine relative to the second figurine.

5. The method of claim 1, further comprising:
    determining a position of the first figurine relative to the second figurine; and wherein:
    the causing of the display screen to present the animation that depicts the action performable by the first figurine together with the second figurine is based on the determined position of the first figurine relative to the second figurine.

6. The method of claim 1, further comprising:
    determining an orientation of the first figurine relative to the second figurine; and wherein:
    the causing of the display screen to present the animation that depicts the action performable by the first figurine together with the second figurine is based on the determined orientation of the first figurine relative to the second figurine.

7. The method of claim 1, further comprising:
    determining an interaction of the first figurine with the second figurine; and wherein:
    the causing of the display screen to present the animation that depicts the action performable by the first figurine together with the second figurine is based on the determined interaction of the first figurine with to the second figurine.

8. Apparatus comprising:
    one or more processors; and
    a memory storing instructions that, when executed by at least one processor among the one or more processors, cause the apparatus to perform operations comprising:
    detecting a first figurine together with a second figurine both within a detection range of a sensor;
    determining a word that describes an action performable by the first figurine together with the second figurine;
    determining that an animation is correlated to the word by a database in which a list of words includes the word that describes the action, the correlated animation depicting the action performable by the first figurine together with the second figurine; and
    causing a display screen to present the animation that is correlated to the word by the database and that depicts the action performable by the first figurine together with the second figurine.

9. The apparatus of claim 8, wherein the operations further comprise:
    identifying the first figurine and the second figurine based on the detecting of the first figurine together with the second figurine both within the detection range of the sensor; and wherein:
    the determining of the word that describes the action performable by the first figurine together with the second figurine is responsive to the identifying of the first figurine and the second figurine.

10. The apparatus of claim 9, wherein:
    the identifying of the first figurine includes identifying at least one of a first animal figure, a first anamorphic figure, a first cartoon figure, or a first action figure; and
    the identifying of the second figurine includes identifying at least one of a second animal figure, a second anamorphic figure, a second cartoon figure, or a second action figure.

11. The apparatus of claim 8, wherein the operations further comprise:
    determining a relationship of the first figurine relative to the second figurine; and wherein:
    the causing of the display screen to present the animation that depicts the action performable by the first figurine together with the second figurine is based on the determined relationship of the first figurine relative to the second figurine.

12. The apparatus of claim 8, wherein the operations further comprise:
  determining a position of the first figurine relative to the second figurine; and wherein:
  the causing of the display screen to present the animation that depicts the action performable by the first figurine together with the second figurine is based on the determined position of the first figurine relative to the second figurine.

13. The apparatus of claim 8, wherein the operations further comprise:
  determining an orientation of the first figurine relative to the second figurine; and wherein:
  the causing of the display screen to present the animation that depicts the action performable by the first figurine together with the second figurine is based on the determined orientation of the first figurine relative to the second figurine.

14. The apparatus of claim 8, wherein the operations further comprise:
  determining an interaction of the first figurine with the second figurine; and wherein:
  the causing of the display screen to present the animation that depicts the action performable by the first figurine together with the second figurine is based on the determined interaction of the first figurine with to the second figurine.

15. A non-transitory machine-readable medium storing instructions that, when executed by one or more processors of a machine, cause the machine to perform operations comprising:
  detecting a first figurine together with a second figurine both within a detection range of a sensor;
  determining a word that describes an action performable by the first figurine together with the second figurine;
  determining that an animation is correlated to the word by a database in which a list of words includes the word that describes the action, the correlated animation depicting the action performable by the first figurine together with the second figurine; and
  causing a display screen to present the animation that is correlated to the word by the database and that depicts the action performable by the first figurine together with the second figurine.

16. The non-transitory machine-readable medium of claim 15, wherein the operations further comprise:
  identifying the first figurine and the second figurine based on the detecting of the first figurine together with the second figurine both within the detection range of the sensor; and wherein:
  the determining of the word that describes the action performable by the first figurine together with the second figurine is responsive to the identifying of the first figurine and the second figurine.

17. The non-transitory machine-readable medium of claim 16, wherein:
  the identifying of the first figurine includes identifying at least one of a first animal figure, a first anamorphic figure, a first cartoon figure, or a first action figure; and
  the identifying of the second figurine includes identifying at least one of a second animal figure, a second anamorphic figure, a second cartoon figure, or a second action figure.

18. The non-transitory machine-readable medium of claim 15, wherein the operations further comprise:
  determining a relationship of the first figurine relative to the second figurine; and wherein:
  the causing of the display screen to present the animation that depicts the action performable by the first figurine together with the second figurine is based on the determined relationship of the first figurine relative to the second figurine.

19. The non-transitory machine-readable medium of claim 15, wherein the operations further comprise:
  determining a position of the first figurine relative to the second figurine; and wherein:
  the causing of the display screen to present the animation that depicts the action performable by the first figurine together with the second figurine is based on the determined position of the first figurine relative to the second figurine.

20. The non-transitory machine-readable medium of claim 15, wherein the operations further comprise:
  determining an orientation of the first figurine relative to the second figurine; and wherein:
  the causing of the display screen to present the animation that depicts the action performable by the first figurine together with the second figurine is based on the determined orientation of the first figurine relative to the second figurine.

21. The non-transitory machine-readable medium of claim 15, wherein the operations further comprise:
  determining an interaction of the first figurine with the second figurine; and wherein:
  the causing of the display screen to present the animation that depicts the action performable by the first figurine together with the second figurine is based on the determined interaction of the first figurine with to the second figurine.

* * * * *

UNITED STATES PATENT AND TRADEMARK OFFICE
CERTIFICATE OF CORRECTION

PATENT NO. : 10,922,994 B2  
APPLICATION NO. : 16/794591  
DATED : February 16, 2021  
INVENTOR(S) : Butler et al.

Page 1 of 1

It is certified that error appears in the above-identified patent and that said Letters Patent is hereby corrected as shown below:

On the Title Page

In item (57), in "Abstract", in Column 2, Line 6, delete "hoard" and insert --board-- therefor In the Specification In Column 3, Lines 23-24, delete "communication" and insert --or pronunciation-- therefor In Column 4, Line 13, delete "MID" and insert --RFID-- therefor Signed and Sealed this  
Fourth Day of May, 2021

Drew Hirshfeld  
*Performing the Functions and Duties of the*  
*Under Secretary of Commerce for Intellectual Property and*  
*Director of the United States Patent and Trademark Office*